US007116808B2

(12) United States Patent
Ditt et al.

(10) Patent No.: US 7,116,808 B2
(45) Date of Patent: Oct. 3, 2006

(54) METHOD FOR PRODUCING AN IMAGE SEQUENCE FROM VOLUME DATASETS

(75) Inventors: Hendrik Ditt, Nuremberg (DE); Norbert Rahn, Forchheim (DE); Siegfried Wach, Hoechstadt (DE)

(73) Assignee: Siemens Aktiengesellschaft, Munich (DE)

( * ) Notice: Subject to any disclaimer, the term of this patent is extended or adjusted under 35 U.S.C. 154(b) by 637 days.

(21) Appl. No.: 10/379,226

(22) Filed: Mar. 4, 2003

(65) Prior Publication Data
US 2003/0169254 A1   Sep. 11, 2003

(30) Foreign Application Priority Data
Mar. 11, 2002   (DE) ................ 102 10 644

(51) Int. Cl.
*G06K 9/00* (2006.01)
(52) U.S. Cl. ...................... 382/128; 345/419
(58) Field of Classification Search ........... 382/128, 382/129, 130, 131, 132, 133, 134, 173, 177, 382/215; 378/4, 22, 62; 345/419; 600/407, 600/410, 424, 443, 427, 533
See application file for complete search history.

(56) References Cited
U.S. PATENT DOCUMENTS
5,923,770 A * 7/1999 O'Donnell et al. ......... 382/131
6,246,784 B1 * 6/2001 Summers et al. .......... 382/128
6,994,673 B1 * 2/2006 Lysyansky et al. ........ 600/443

OTHER PUBLICATIONS

"Feature-Based Volume Metamorphosis," Lerios et al., Computer Graphics Proc., SIGGRAPH '95 (1995), pp. 449-456.
"Computer Graphics Principles and Practice," Foley et al. (1996), pp. 1058-1064.
"Geometrische Deformationen als Werkzeug in der graphischen Datenverarbeitung," Ruprecht (1994) pp. 146-159, 211-221.

* cited by examiner

*Primary Examiner*—Jingge Wu
*Assistant Examiner*—Abolfazl Tabatabai
(74) *Attorney, Agent, or Firm*—Schiff Hardin LLP

(57) ABSTRACT

In a method for producing an image sequence on the basis of two volume datasets that were acquired at different points in time, a first set of deformation vectors is determined that maps image contents of the first volume dataset onto image contents of the second volume datasets, subsequently a second set of deformation vectors is determined that maps image contents of the second volume dataset onto image contents of the first volume dataset. Subsequently, sets of intermediate volume datasets are produced using attenuated deformation vectors with deformation factors $A_i$ and $B_i$. Dependent on the size of the deformation factors, the image information of the individual intermediate volume datasets are shifted to different degrees in relationship to the corresponding volume dataset. Subsequently, a set of dissolve volume datasets is produced and displayed as an image sequence.

13 Claims, 3 Drawing Sheets

METHOD FOR PRODUCING AN IMAGE SEQUENCE FROM VOLUME DATASETS

BACKGROUND OF THE INVENTION

1. Field of the Invention

The present invention is directed to a method for producing a sequence of volume datasets on the basis of two volume datasets.

2. Description of the Prior Art

It is known from the literature, such as, for example, Detlef Ruprecht, "Geometrische Deformationen als Werkzeug in der graphischen Datenverarbeitung", Dissertation of the University of Dortmund, 1994, pages 146–149 (also published in the Shaker Verlag, Aachen, 1995), to produce that an image sequence from two-dimensional images of an exposure subject by means of deformed dissolving, for example "morphing". The image sequence begins with one of the images, the initial image, and ends with the other image, the target image. Intermediate images needed for the image sequence are generated from the initial image and the target image by means of interpolation techniques. First, point pairs of the initial image and the target image that correspond to one another are identified. A deformation of the initial image onto the target image and a deformation of the target image onto the initial image are calculated with the corresponding point pairs. The intermediate images are calculated by means of attenuated deformation. The picture elements of the initial or target image are displaced by only a part of the path determined by the deformation. Obtained as a result are a series of increasingly deformed images that proceed from the initial image and a series of decreasingly deformed images that leads to the target image. Subsequently, the two series are dissolved, resulting in a series of two-dimensional images that begins with the initial image and ends with the target image.

In the context of a medical follow-up study, for example, modality exposures of a patient are made at different points in time in order, for example, to recognize the changes in position and shape of tissue structures of the patient. One example of a follow-up study is the observation of a tumor treatment of the patient. For example, a physician treating the patient registers tomograms of the patient with a computed tomography system before and during the tumor treatment and compares them. An evaluation of the tomograms is difficult because the tomograms do not create any spatial impression.

It is also common to produce a CT exposure of the heart into which a heart catheter is introduced, before the introduction of a heart catheter. During the introduction of the heart catheter, the CT exposure is dissolved with ECG-triggered X-ray exposures of the heart in order to monitor the position of the heart catheter or to designationally control the heart catheter relative to the anatomy of the heart. The position of the catheter relative to the anatomy of the heart can vary greatly due to the contraction and relaxation of the heart muscle, so that it would be desirable to also display the dissolving at points in time other than the discrete point in time of the CT exposure, to enable visualization of the position of the catheter relative to the pre-operatively registered CT exposure at any time. In order to realize this, a sequence of CT exposures that essentially covers the entire time span of the heart rhythm would have to be registered before the intervention. This cannot be done in practice because it would expose the patient to an excessively high radiation load.

SUMMARY OF THE INVENTION

An object of the invention is to provide a method with which a sequence of volume datasets can be produced from two volume datasets of an examination subject that were produced at two different points in time.

The object of the invention is achieved by a method for producing a sequence of volume datasets including the following steps.

A first set of deformation vectors is determined that maps volume elements of a first volume dataset of an examination subject onto volume elements of a second volume dataset of the examination subject, the first volume dataset and the second volume having been acquired at different points in time. A second set of deformation vectors is determined that maps volume elements of the second volume dataset onto volume elements of the first volume dataset. A first set of intermediate volume datasets with i intermediate volume datasets is produced by mapping the first volume dataset with an $i^{th}$ attenuated set of deformation vectors of the first set of deformation vectors onto the $i^{th}$ intermediate volume dataset of the first set of intermediate volume datasets. The $i^{th}$ set of attenuated deformation vectors of the first set of deformation vectors is calculated by a multiplication of the deformation vectors of the first set of deformation vectors by a deformation factor $A_i$ with $0 < A_i < 1$. A second set of intermediate volume datasets is produced by mapping the second volume dataset with an $i^{th}$ attenuated set of deformation vectors of the second set of deformation vectors onto the $i^{th}$ intermediate volume dataset of the second set of intermediate volume datasets. The $i^{th}$ set of attenuated deformation vectors of the second set of deformation vectors is calculated by a multiplication of the deformation vectors of the second set of deformation vectors by a deformation factor $B_i$ with $0 < B_i < 1$.

The first and second sets of intermediate volume datasets respectively contain pairs of corresponding intermediate volume datasets, with one intermediate volume dataset in each pair being in the first set of intermediate volume data sets and the other intermediate volume dataset in the pair being in the second set of intermediate volume datasets. A set of dissolve volume datasets is produced by, for a first of the pairs of corresponding intermediate datasets, multiplying a first intermediate volume dataset in the first of the pairs by a factor $k = (1 - A_i)$ to obtain a first product and multiplying a second intermediate volume dataset in the first of the pairs by a factor $k' = (1 - B_i)$ to obtain a second product, and the first and second products are added to obtain a first of the dissolve volume datasets. Similarly, for a second of the pairs corresponding intermediate volume datasets, a first intermediate volume dataset in the second of the pairs is multiplied by a factor $m = (1 - k)$ to obtain a third product and a second intermediate volume dataset in the second of the pairs is multiplied by a factor $m' = (1 - k')$ to obtain a fourth product, and the third and fourth products are added to obtain a second of the dissolve volume datasets. The dissolve volume datasets are sorted according to increasing $A_i$ to obtain a sequence, and the dissolve volume datasets are then sequentially displayed.

According to the inventive method, the first and second sets of deformation vectors are determined first by mapping volume elements of the first volume dataset onto volume elements of the second volume dataset. The sets of deformation vectors indicate the way the image data mapped by means of the two volume datasets are shifted relative to one another. The two sets of intermediate volume datasets are subsequently produced The image data of the individual intermediate volume datasets are shifted to different degrees in relationship to the corresponding volume dataset dependent on the size of the deformation factors $A_i$ and $B_i$. Subsequently, the set of dissolve volume datasets is produced. Since this is also sorted according to increasing deformations factor $A_i$, a sequence of volume datasets arises that begins with the first volume dataset, then includes the dissolve volume datasets sorted according to ascending $A_i$, and ends with the second volume dataset.

In an embodiment of the invention, the first set of deformation vectors is determined by the following method steps.

Individual volume element pairs are manually determined that each includes a volume element of the first volume dataset and a volume element of the second volume dataset. The volume element of the first volume dataset is mapped onto the corresponding volume element of the second volume dataset in the pair.

The deformation vectors allocated to the manually-identified volume element pairs is determined.

The remaining deformation vectors of the first set of deformation vectors are determined by means of suitable interpolation of those deformation vectors that are determined on the basis of the manually identified volume element pairs.

The volume element pairs of the two volume sets are, for example, corresponding contours, surfaces or prominent points of the image information contained in the two volume datasets.

Instead of the manual determination of individual volume element pairs, the first set of deformation vectors can be determined according to the following steps in a preferred version of the invention.

the first and the second volume dataset are analyzed with means for pattern recognition.

On the basis of this analysis, volume element pairs are determined that each include a volume element of the first volume dataset and a volume element of the second volume dataset. The volume element of the first volume dataset is mapped onto the corresponding volume element of the second volume dataset in the pair.

The deformation vectors of the first set of deformation vectors are determined on the basis of this analysis.

The first set of deformation vectors can be automatically determined on the basis of the analysis with the means for pattern recognition, however, a mix of manual determination of individual deformation vectors and analysis of the two volume datasets is also possible.

The first set of deformation vectors can also be determined according to the following steps in another preferred embodiment of the invention.

A first grid is determined that is placed over the first volume dataset.

Individual grid points of the first grid are shifted until the first volume dataset is mapped optimally well onto the second volume dataset.

The deformation vectors of the first set of deformation vectors is determined based on the shift.

The deformation vectors of the first set of deformation vectors are automatically determined in a vector field due to the determination of the grid.

In another embodiment of the invention, the second set of deformation vectors is determined analogously to the first set of deformation vectors.

The inventive method, in particular, can be employed in medical technology when the exposure subject is a living subject according to a further version of the invention. In a preferred embodiment of the invention, for example, the first and the second volume dataset can be acquired during two different phases of the heartbeat of a patient. As set forth in the introduction, a CT exposure of the heart into which the heart catheter is introduced can be produced before the application of the heart catheter. During the introduction of the heart catheter, the CT exposure is dissolved with ECG-triggered X-ray exposures of the heart. Since an exposure of a sequence of CT images that essentially covers the entire time span of the heart rhythm cannot be realized due to an excessively high radiation load on the patient, conventionally only a single CT exposure is produced before the intervention, at a defined point in time of the heartbeat rhythm. Due to the contraction and relaxation of the heart muscle, the position of the catheter relative to the anatomy of the heart varies greatly, so that the dissolving usually can be displayed only at the discrete point in time of the CT exposure. The inventive method, however, enables a fluid sequence of the heartbeat to be obtained during an entire heartbeat rhythm on the basis of a few CT exposures. Before the intervention, for example, three volume datasets of the heart are acquired at different points in time of the heartbeat rhythm, for example with a computed tomography apparatus. In order to obtain a fluid sequence of the heart, which usually beats regularly, three sets of dissolve volume datasets are produced. One set of dissolve volume datasets, for example, allows a fluid transition from the first volume dataset, which was prepared at the beginning of the heartbeat rhythm, to the second volume dataset that was registered later with reference to the heartbeat rhythm. A further set of dissolve volume datasets allows a transition from the second volume dataset to the third volume dataset, which was registered later with reference to the second volume dataset. A further set of dissolve volume datasets, finally, allows a transition from the third volume dataset to the first volume dataset. The heartbeat can thus be visually presented as a sequence by means of a few registered volume datasets.

In a further version of the invention the exposure subject is a tumor. Consequently, it becomes possible for a physician to observe the temporal growth of the tumor better on the basis of two or of a few registered volume datasets. The result of an implemented therapy thus can be evaluated significantly simpler. The visualization of the change of the tumor is not limited to a tomogram since three-dimensional volumes can be viewed wherein more information is contained. A presentation of a segmented surface can be visualized with a surface shaded display (SSD), and a view through the body can be visualized with a virtual rendering technique (VRT). As a result of this plastic presentation, it is easier for the physician to recognize changes of the tumor.

According to a further version of the invention, the first and second volume dataset are acquired with an imaging device of the same type or with the same imaging device.

Since the inventive method can be particularly employed in medical technology, it is provided in a further version that the imaging device is a medical-technical device.

DESCRIPTION OF THE PREFERRED EMBODIMENTS

Figure 1:
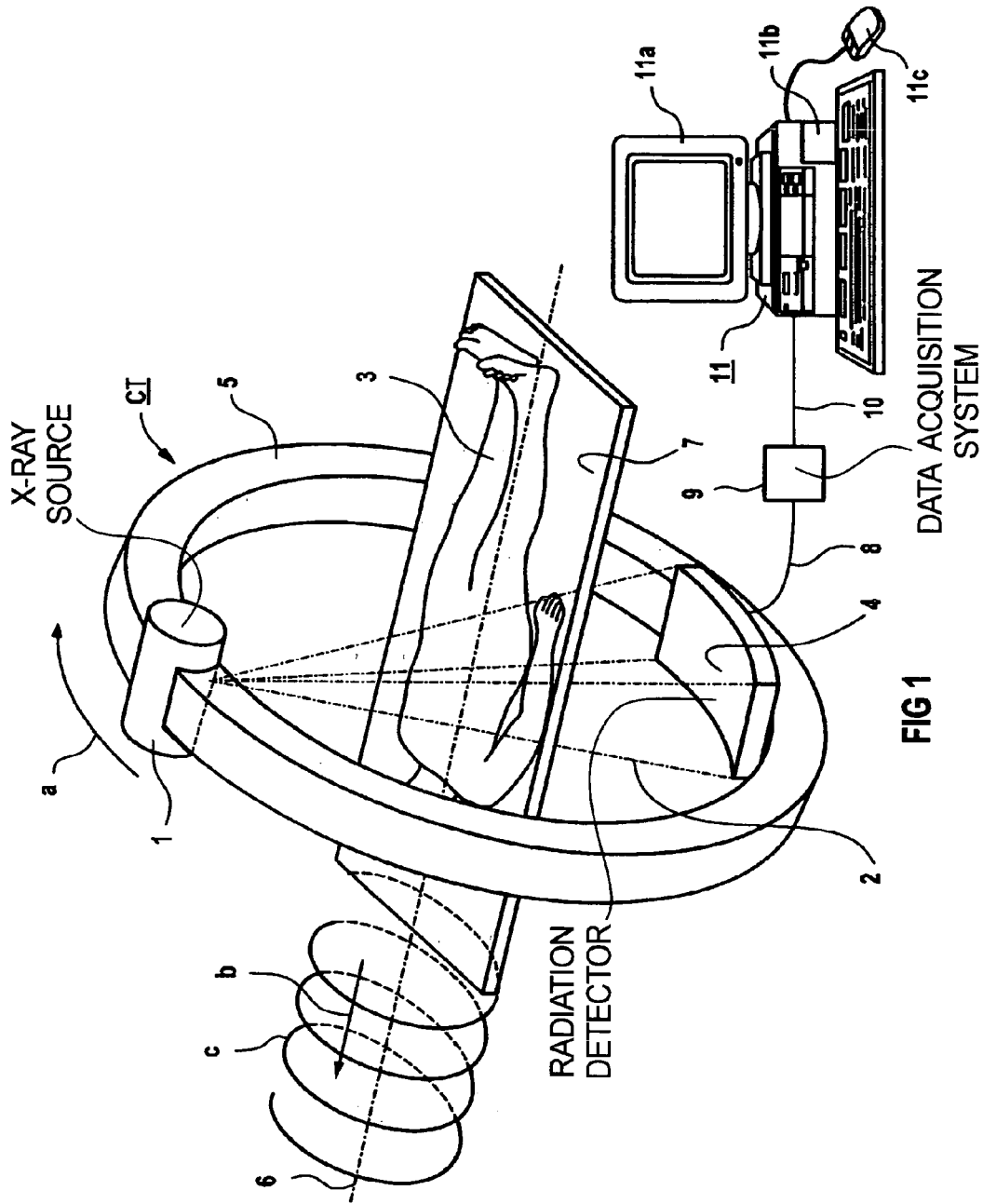
FIG. 1 is a schematic illustration of a computed tomography apparatus operable in accordance with the inventive method.

FIG. 1 schematically shows a computed tomography (CT) apparatus with an X-ray source 1 that emits a pyramid-shaped X-ray beam 2, the boundary rays of which are shown with dot-dashed lines in FIG. 1. The beam 2 penetrates a patient 3 and strikes a radiation detector 4. In the exemplary embodiment, the X-ray source 1 and the radiation detector 4 are arranged at a ring-shaped gantry 5 lying opposite one another. The gantry 5 is seated at a mounting apparatus (not shown in FIG. 1) so as to be rotatable (as indicated by arrow a around a system axis 6, which proceeds through the center of the annular gantry 5.

In the exemplary embodiment, the patient 3 lies on a table 7 that is transparent to X-rays and that is displaceable along the system axis 6 (see arrow b) by a suitable mechanism, which is not shown in FIG. 1.

The X-ray source 1 and the radiation detector 4 thus form a measurement system that is rotatable relative to the system axis 6 and is displaceable along the system axis 6 relative to the patient 3, so that the patient 3 can be transirradiated from different projections angles and different positions relative to the system axis 6. During a spiral scan, this measurement system rotates relative to the system axis 6 and the table 7 moves continuously in the direction of the arrow b, i.e. the measurement system including the X-ray source 1 and the radiation detector 4 moves continuously on a spiral path c relative to the patient 3 until the region of interest of the patient 3 has been covered completely. A data acquisition system 9 forms measured values from the output signals of the radiation detector 4 that as a result arise, these measured values being supplied to a computer 11. A computer program that calculates a volume dataset of the region of interest of the patient 3 from the measured values and that is familiar to a person skilled in the art runs on the computer 11. The volume dataset can be stored in a memory 11b of the computer 11, and an image allocated to the volume dataset can be reproduced on a monitor 11a of the computer 11. For example, the image allocated to the volume dataset can be rotated with a mouse 11c of the computer, so that this image can be viewed from different viewing directions. In the exemplary embodiment, the data acquisition system 9 is connected to the radiation detector 4 with an electrical line 8 that, for example, contains a wiper ring system or a wireless transmission link to obtain the output signals from the radiation detector 4 in a known manner that has not been shown. The computer 11 and the data acquisition device 9 are connected with an electrical line 10.

In the exemplary embodiment, the patient 3 has a tumor. In order to observe a change in the tumor over time, a physician (not shown in FIG. 1) attending the patient 3 produces two volume datasets of the patient 3 that encompasses the tumor. The physician registers the two volume datasets on two different days and stores them in the memory 11b of the computer 11. In the exemplary embodiment, the physician acquires the second volume dataset two weeks after the first volume dataset.

In order to recognize the change in the tumor, the physician can display the images allocated to the two volume datasets next to one another on the monitor 11a to give the physician a better impression of the change in the tumor, the physician would like to have a sequence produced from the two volume sets with which the physician can recognize a gradual change in the tumor over time. Using a mark (not shown in FIG. 1) that is mixed into the monitor 11a and that can be moved with the mouse 11c of the computer, the physician therefore marks a number of volume element pairs in the respective images displayed at the monitor 11a. Each volume element pair contains one volume element of the first and one volume element of the second volume dataset. A volume element pair indicates how the volume element of the first volume dataset is imaged onto the corresponding volume element of the second volume dataset. In the exemplary embodiment, marked volume elements are allocated to the surfaces of the changing tumor.

On the basis of the volume element pairs, a computer program running in the computer 11 calculates a first set of deformation vectors that deforms the image contents of the first volume dataset onto the image contents of the second volume dataset. The computer program of the computer 11 calculates some of the deformation vectors of the first set of deformation vectors directly from the volume element pairs. Since, however, the physician only marks a limited number of volume element pairs, the computer program calculates further deformation vectors of the first set of deformation vectors needed for the deformation by interpolating deformation vectors calculated directly on the basis of the volume element pairs.

Subsequently, the computer program of the computer 11 calculates a second set of deformation vectors that deforms the image contents of the second volume dataset onto the image contents of the first volume dataset. The computer program calculates some of the deformation vectors directly from the volume element pairs. The computer program calculates further deformation vectors of the second set of deformation vectors needed for the deformation by interpolating deformation vectors calculated directly on the basis of the volume element pairs.

Subsequently, the computer program running on the computer 11 calculates two sets of intermediate volume datasets that each contain two intermediate volume datasets in the exemplary embodiment.

Each of the two intermediate volume datasets of the first set of intermediate volume datasets is calculated by mapping the first volume dataset onto the corresponding intermediate volume dataset of the first set of intermediate volume datasets with an attenuated set of deformation vectors of the first set of deformation vectors. The attenuated deformation vectors of the first set of deformation vectors are calculated by multiplying the deformation vectors of the first set of deformation vectors by a deformation factor $A_i$, with i=1, 2 and $0<A_i<1$. In the exemplary embodiment, the deformation factor $A_1$ for the first intermediate volume dataset of the first set of intermediate volume datasets is equal to 0.33, and the deformation factor $A_2$ for the second intermediate volume dataset of the first set of intermediate volume datasets is equal to 0.67.

The two intermediate volume datasets of the second set of intermediate volume datasets are calculated in the same way. The second volume dataset is mapped onto the corresponding intermediate volume dataset of the second set of intermediate volume datasets using an attenuated set of deformation vectors of the second set of deformation vectors. The attenuated deformation vectors of the second set of deformation vectors are calculated by multiplying the deformation vectors of the second set of deformation vector by a deformation factor $B_i$, with i=1, 2 and $0<B_i<1$. In the exemplary embodiment, the deformation factor $B_1$ for the first intermediate volume dataset of the second set of intermediate volume datasets is equal to 0.67, and the deformation factor $B_2$ for the second volume dataset of the second set of intermediate volume datasets is equal to 0.33.

Subsequently, the computer program running in the computer 11 calculates a set of dissolve volume datasets that includes two dissolve volume datasets in the exemplary embodiment. The first dissolve volume dataset is calculated by multiplying the grayscale values of the first intermediate volume dataset of the first set of intermediate volume datasets are multiplied by one minus the deformation factor $A_i$, i.e. multiplication by 0.67, and multiplying the grayscale values of the first intermediate volume dataset of the second set of intermediate volume datasets by one minus the deformation factor $B_1$, i.e. by 0.33. Subsequently, the grayscale values of the individual volume elements (arising from the aforementioned multiplication) of the corresponding volume datasets are added, the first dissolve volume dataset arising as a result.

The second dissolve volume dataset is calculated by multiplying the second intermediate volume dataset of the first set of intermediate volume datasets by the deformation factor $A_2$=0.67, and by multiplying the second volume dataset of the second intermediate volume dataset by the deformation factor $B_2$=0.33. Subsequently, the grayscale values of the individual volume elements (arising from the aforementioned multiplications) of the corresponding intermediate volume datasets are added to produce the second dissolve volume dataset.

Subsequently, the computer 11 displays a sequence on the monitor 11a that begins with the first volume dataset and ends with the second volume dataset. The first dissolve volume dataset and the second dissolve volume dataset are displayed in ascending sequence between the first and second volume datasets. When this sequence is shown in temporal succession on the monitor 11a, then the physician can observe the change in the tumor in a simple way.

Figure 2:
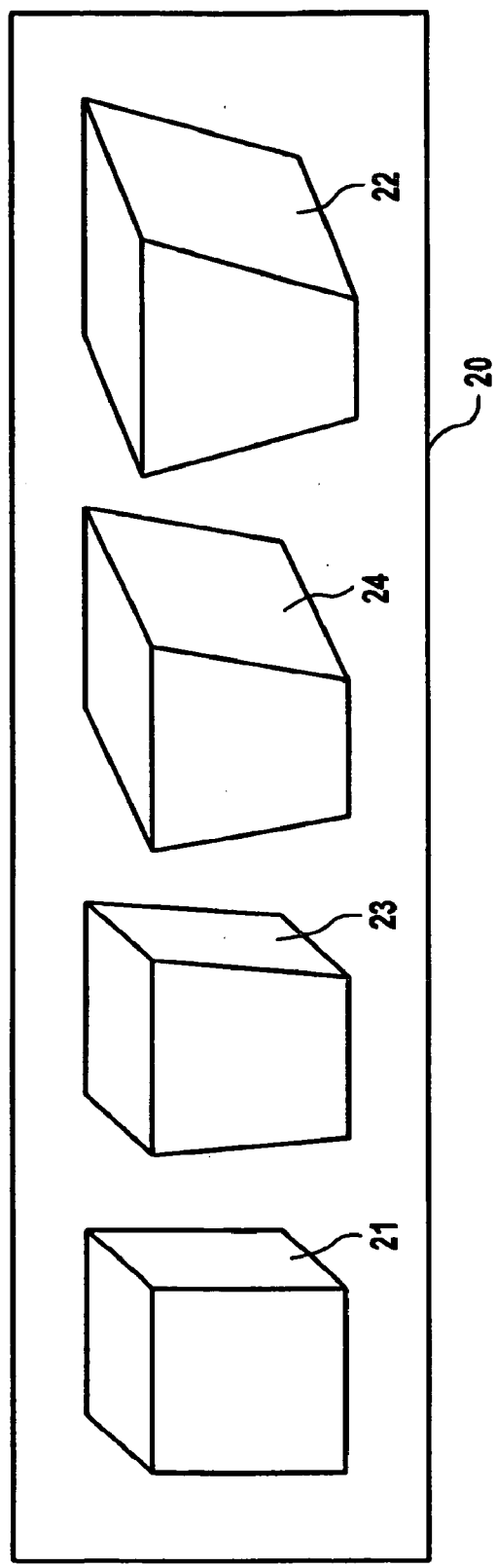
FIG. 2 schematically illustrates an image sequence produced in accordance with the inventive method.
Figure 3:
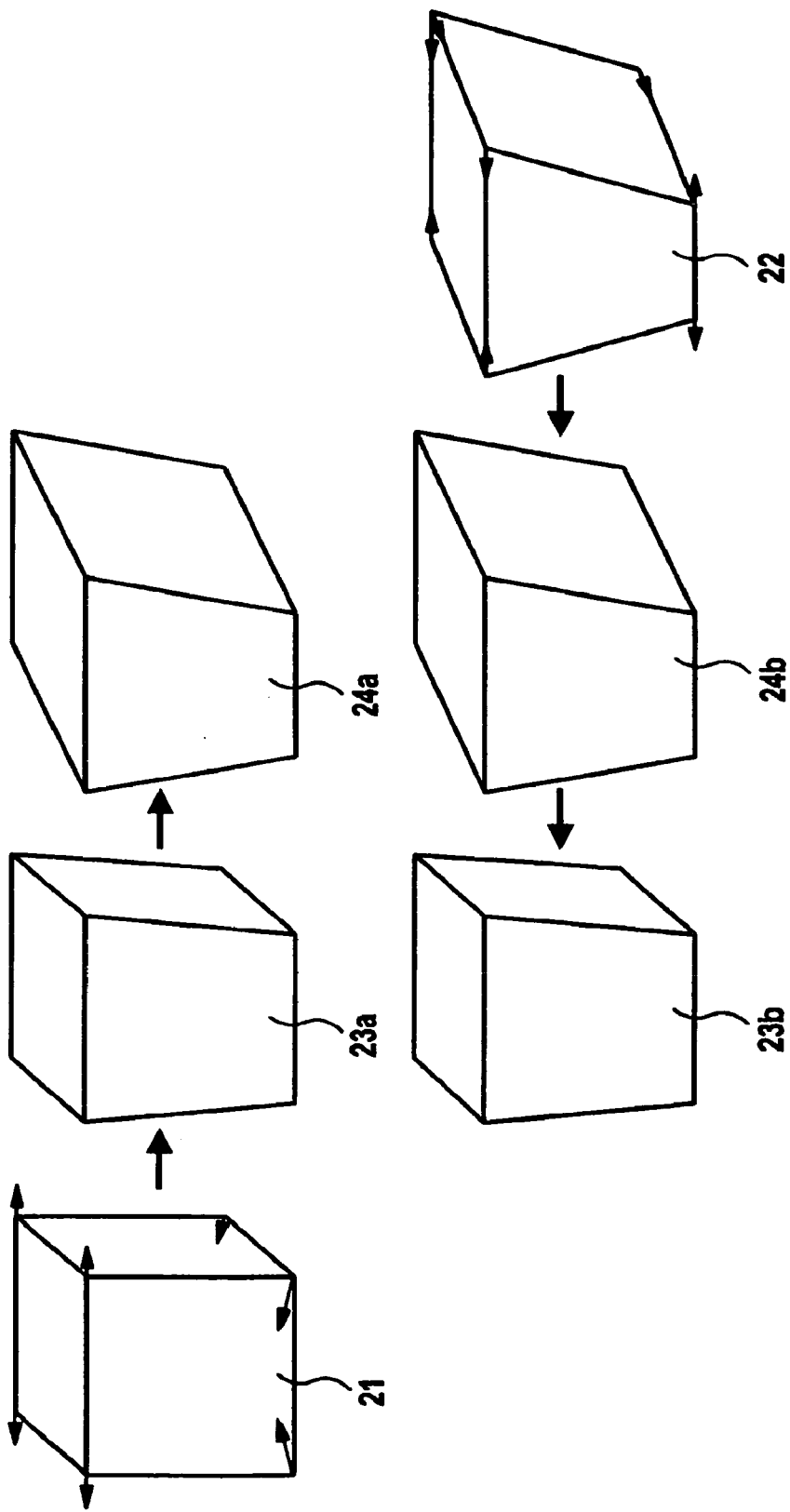
FIG. 3 schematically illustrates volumes associated with intermediate volume datasets used to produce the image sequence of FIG. 2.

FIG. 2 illustrates a sequence 20 that begins with a volume 21 and ends with a volume 22. The volume dataset allocated to the volume 21 was made of an exposure subject that, for example, is the aforementioned tumor temporally before the volume dataset allocated to the volume 22. The sequence further includes volumes 23 and 24. The dissolve volume datasets allocated to the volumes 23 and 24 each are produced from two intermediate volume datasets. The volumes 23a through 24b allocated to the intermediate volume datasets are shown in FIG. 3.

In order to produce the dissolve volume datasets allocated to the volumes 23 and 24, volume element pairs of the volume datasets allocated to the volumes 21 and 22 are first determined in order to obtain a suitable set of deformation vectors therefrom that map the image contents of the volume 21 onto the image contents of the volume 22. A second set of deformation vectors is analogously determined; the second set of deformation vectors maps image contents of the volume 22 onto the image contents of the volume 21.

Subsequently, two sets of intermediate volume sets are determined. Each of the two sets of intermediate volume datasets contains two intermediate volume datasets in the exemplary embodiment.

The intermediate volume datasets of the first set of intermediate volume datasets are calculated by mapping the volume dataset allocated to the volume 21 with an attenuated set of deformation vectors that map the image contents of the volume 21 onto the volume 22. In the exemplary embodiment, the deformation factor $A_1$ for the first intermediate volume dataset is equal to 0.33 and the deformation factor $A_2$ for the second intermediate volume dataset is equal to 0.67. The volumes allocated to these intermediate volume datasets are designated with reference characters 23a and 24a, with the deformation factor $A_1$ equal to 0.33 is allocated to the volume 23a and the deformation factor $A_2$ equal to 0.67 being allocated to the volume 24a.

The intermediate volume datasets of the second set of the intermediate volume datasets are calculated by mapping the volume dataset allocated to the volume 22 with an attenuated set of deformation vectors that map the image contents of the volume 22 onto the volume 21. In the exemplary embodiment, the deformation factor $B_1$ for the first intermediate volume dataset is equal to 0.67 and the deformation factor $B_2$ for the second intermediate volume dataset is equal to 0.33. The volumes allocated to these intermediate volume datasets are designated with the reference characters 23b and 24b, with the deformation factor $B_1$ equal to 0.67 being allocated to the volume 23b and the deformation factor $B_2$ equal to 0.33 being allocated to the volume 24b.

The dissolve volume dataset allocated to the volume 23 is calculated by multiplying the grayscale values of the intermediate volume dataset allocated to the volume 23a by 0.67, which corresponds to one minus the deformation factor $A_1$, and the grayscale values of the intermediate volume dataset allocated to the volume 23b are multiplied by 0.33, which corresponds to one minus the deformation factor $B_1$. Subsequently, the grayscale values of the individual volume elements of the corresponding intermediate volume datasets are added.

The dissolve volume dataset allocated to the volume 24 is calculated by multiplying the grayscale values of the volume dataset allocated to the volume 24a by 0.33, which corresponds to one minus the deformation factor $A_2$, and the grayscale values of the intermediate volume dataset allocated to the volume 24b are multiplied by 0.67, which corresponds to one minus the deformation factor $B_2$. Subsequently, the grayscale values of the individual volume elements of the corresponding intermediate volume datasets are added.

In the exemplary embodiment, the first and second volume dataset were produced with a computed tomography apparatus. Other devices or technical facilities, that need not necessarily be medical-technical devices or technical facilities, with which the volume datasets can be produced can also be employed in the inventive method. The first and second volume datasets need not necessarily be produced with the same imaging device.

The volume element pairs, moreover, need not necessarily be manually determined. They can also be found with means for pattern recognition. A combination of manual and automatic determination of the volume element pairs is also possible.

Although modifications and changes may be suggested by those skilled in the art, it is the intention of the inventors to embody within the patent warranted hereon all changes and modifications as reasonably and properly come within the scope of their contribution to the art.

We claim:

1. A method for producing an image sequence comprising the steps of:
    determining a first set of deformation vectors that maps volume elements of a first volume dataset of an examination subject onto volume elements of a second volume dataset of said examination subject, acquired at a point in time different from said first volume dataset;
    determining a second set of deformation vectors that maps volume elements of the second volume dataset onto volume elements of the first dataset;
    producing a first set of intermediate volume datasets comprising i intermediate volume datasets by, for each intermediate volume dataset in said first set of intermediate volume datasets, calculating a first attenuated deformation vector from a weighting of the deformation vectors of said first set of deformation vectors with a deformation factor $A_i$, with $0<A_i<1$, and by multiplying the volume elements in said first volume dataset respectively by said first attenuated deformation vectors;

producing a second set of intermediate volume datasets comprising i intermediate volume datasets by, for each of said intermediate volume datasets in said second set of intermediate volume datasets, calculating an attenuated deformation vector from a weighting of the deformation vectors of said second set of deformation vectors with a deformation factor $B_i$ with a sum of $A_i$ and $B_i$ being substantially equal to one, and multiplying the volume elements of said second volume dataset by said attenuated deformation vectors formed from said second set of deformation vectors, said first and second sets of intermediate volume datasets containing pairs of corresponding intermediate volume datasets respectively in said first and second sets of intermediate volume datasets;

producing a set of dissolve volume datasets by, for a first of said pairs of corresponding intermediate datasets, multiplying a first intermediate volume dataset in the first of said pairs by a factor $k=(1-A_i)$ to obtain a first product and multiplying a second intermediate volume dataset in the first of said pairs by a factor $k'=(1-B_i)$ to obtain a second product and adding said first and second products to obtain a first of said dissolve volume datasets, and for a second of said pairs of corresponding intermediate volume datasets, multiplying a first intermediate volume dataset in said second of said pairs by a factor $m=(1-k)$ to obtain a third product and multiplying a second intermediate volume dataset in said second of said pairs by a factor $m'=(1-k')$ to obtain a fourth product and adding said third and fourth products to obtain a second of said dissolve volume datasets;

sorting said dissolve volume datasets according to increasing $A_i$ to obtain a sequence; and displaying said dissolve volume datasets in said sequence.

2. A method as claimed in claim 1 wherein the step of determining said first set of deformation vectors comprises:
manually identifying a plurality of volume element pairs, each of said volume element pairs comprising a volume element of said first volume dataset and an anatomically corresponding volume element of said second volume dataset, with the volume element of the first volume set being mapped onto the corresponding volume element of the second volume dataset;
for each of said manually identified volume element pairs, determining a deformation vector allocated thereto; and
determining further deformation vectors of said first set of deformation vectors by interpolation based on the respective deformation vectors allocated to the manually identified volume element pairs.

3. A method as claimed in claim 1 wherein the step of determining said first set of deformation vectors comprises:
analyzing said first and second volume datasets with a pattern recognition algorithm to obtain a pattern recognition analysis result;
dependent on said pattern recognition analysis result, determining a plurality of volume element pairs each containing a volume element of said first volume dataset and an anatomically corresponding volume element of said second volume dataset, with said volume element of said first volume dataset mapped onto the corresponding volume element of the second volume dataset; and
generating said first set of deformation vectors by allocating respective deformation vectors to said volume element pairs.

4. A method as claimed in claim 1 wherein the step of determining said first set of deformation vectors comprises:
generating a grid, comprising a plurality of individual grid points, and placing said grid over said first volume dataset;
shifting the individual grid points of said grid until said first volume dataset is optimally mapped onto said second volume dataset and identifying a shift of said grid resulting in said optimal mapping; and
determining said deformation vectors in said first set of deformation vectors dependent on said shift.

5. A method as claimed in claim 1 wherein the step of determining said second set of deformation vectors comprises:
manually identifying a plurality of volume element pairs, each of said volume element pairs comprising a volume element of said first volume dataset and an anatomically corresponding volume element of said second volume dataset, with the volume element of the second volume set being mapped onto the corresponding volume element of the first volume dataset;
for each of said manually identified volume element pairs, determining a deformation vector allocated thereto; and
determining further deformation vectors of said second set of deformation vectors by interpolation based on the respective deformation vectors allocated to the manually identified volume element pairs.

6. A method as claimed in claim 1 wherein the step of determining said second set of deformation vectors comprises:
analyzing said first and second volume datasets with a pattern recognition algorithm to obtain a pattern recognition analysis result;
dependent on said pattern recognition analysis result, determining a plurality of volume element pairs each containing a volume element of said first volume dataset and an anatomically corresponding volume element of said second volume dataset, with said volume element of said second volume dataset mapped onto the corresponding volume element of the first volume dataset; and
generating said first set of deformation vectors by allocating respective deformation vectors to said volume element pairs.

7. A method as claimed in claim 1 wherein the step of determining said second set of deformation vectors comprises:
generating a grid, comprising a plurality of individual grid points, and placing said grid over said second volume dataset;
shifting the individual grid points of said grid until said second volume dataset is optimally mapped onto said first volume dataset and identifying a shift of said grid resulting in said optimal mapping; and
determining said deformation vectors in said second set of deformation vectors dependent on said shift.

8. A method as claimed in claim 1 comprising employing datasets, as said first and second volume datasets, representing data obtained from a living subject.

9. A method as claimed in claim 1 comprising employing datasets, as said first and second volume datasets, respectively registered at two different phases of a heartbeat of a heart.

10. A method as claimed in claim 1 comprising employing datasets, as said first and second volume datasets representing data obtained from a tumor.

11. A method as claimed in claim 1 comprising employing datasets, as said first and second volume datasets, respectively acquired with different imaging devices of a same type.

12. A method as claimed in claim 1 comprising employing datasets, as said first and second volume datasets, acquired with the same imaging device.

13. A method as claimed in claim 1 comprising employing datasets, as said first and second volume datasets, acquired with a medical-technical device.

* * * * *